(12) United States Patent
Chen

(10) Patent No.: US 10,031,774 B2
(45) Date of Patent: Jul. 24, 2018

(54) SCHEDULING MULTI-PHASE COMPUTING JOBS

(71) Applicant: RED HAT, INC., Raleigh, NC (US)

(72) Inventor: Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 181 days.

(21) Appl. No.: 14/884,402

(22) Filed: Oct. 15, 2015

(65) Prior Publication Data

US 2017/0109199 A1 Apr. 20, 2017

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
None
See application file for complete search history.

(56) References Cited

U.S. PATENT DOCUMENTS

| | | | |
|---|---|---|---|
| 7,302,450 B2 | 11/2007 | Benedetti et al. | |
| 7,954,106 B2 | 5/2011 | Kern et al. | |
| 8,271,983 B2 | 9/2012 | Longobardi | |
| 8,555,287 B2 | 10/2013 | Ding et al. | |
| 8,806,015 B2 | 8/2014 | Dutta et al. | |
| 8,838,801 B2* | 9/2014 | Alapati | G06F 9/5072 709/223 |
| 8,910,173 B2 | 12/2014 | Kruglick | |
| 9,342,355 B2* | 5/2016 | Lin | G06F 9/5066 |
| 2005/0076043 A1* | 4/2005 | Benedetti | G06F 9/5083 |
| 2012/0084781 A1* | 4/2012 | Isaka | G06F 9/5038 718/100 |
| 2012/0131591 A1* | 5/2012 | Moorthi | G06Q 10/06 718/104 |
| 2013/0007272 A1 | 1/2013 | Breitgand et al. | |
| 2014/0229221 A1* | 8/2014 | Shih | G06Q 10/06313 705/7.23 |

(Continued)

OTHER PUBLICATIONS

Chen, "Overload Control in QoS-Aware Web Servers", Computer Networks, Jan. 16, 2003, 15 pages.

(Continued)

*Primary Examiner* — Diem Cao
(74) *Attorney, Agent, or Firm* — Lowenstein Sandler LLP

(57) ABSTRACT

An implementation of the disclosure provides a scheduler for scheduling multi-phase computing jobs where each phase utilizes different amount of resources for executing the jobs in that phase. To schedule the jobs, the scheduler receives a profile for a computing job describing the execution phases associated with one more complied executable modules. The profile includes a plurality of job phase definitions. Each job phase definition includes an estimated amount of computing resources utilized by executing a respective job phase. An identifier of the computing job is appended to a job queue. A combination of one or more computing jobs is selected from the job queue. Thereupon, this combination is scheduled for execution, if it is determined that a total of the estimated amount of computing resources for executing computing jobs in each of one or more of the respective jobs phases satisfies a threshold resource amount associated with the combination.

20 Claims, 7 Drawing Sheets

(56) References Cited

U.S. PATENT DOCUMENTS

| | | | | |
|---|---|---|---|---|
| 2014/0289733 | A1* | 9/2014 | Fritz | G06F 9/5066 718/104 |
| 2015/0199208 | A1* | 7/2015 | Huang | G06F 9/45533 718/1 |
| 2015/0215173 | A1* | 7/2015 | Dutta | G06F 9/505 709/226 |
| 2016/0203434 | A1* | 7/2016 | Sivakumar | G06Q 10/06311 705/7.14 |
| 2017/0017521 | A1* | 1/2017 | Gupta | G06F 9/5011 |

OTHER PUBLICATIONS

Burns, "GoogleCloudPlatform/kubernetes", Github, Jun. 9, 2015, 5 pages, https://github.com/GoogleCloudPlatform/kubernetes/blob/master/docs/design/persistent-storage.md.

Sandholm et al., "Dynamic Proportional Share Scheduling in Hadoop", Hewlett-Packard Laboratories, accessed Oct. 15, 2015, 20 pages, http://www.cs.huji.ac.il/~feit/parsched/jsspp10/p7-sandholm.pdf.

"Job Scheduling", Sparks, accessed Oct. 15, 2015, 7 pages, https://spark.apache.org/docs/latest/job-scheduling.html.

* cited by examiner

US 10,031,774 B2

SCHEDULING MULTI-PHASE COMPUTING JOBS

TECHNICAL FIELD

This disclosure is related generally to scheduling computing jobs, and more particularly, to methods of scheduling multi-phase computing jobs, such as MapReduce jobs.

BACKGROUND

MapReduce is a programming model for processing large data sets. The MapReduce programming model comprises a map procedure that performs filtering and sorting and a reduce procedure that perform a summary operation. Typically, a MapReduce job is performed on clusters of computers, such as clusters of storage servers in a distributed file system. For example, a file system may have clusters of storage servers, such that each cluster includes a master node and one or more worker nodes. During the "map" phase, a master node may receive a job request to perform an operation using a file or data located in the memory. The master node may divide the job into smaller sub-jobs, and may distribute the sub-jobs to the worker nodes. The worker nodes may process the sub-jobs in parallel and may pass the results back to the master node. During the "reduce" phase, the master node may collect the results of the sub-jobs and combine the results by performing a summary operation to form the output for the job request. MapReduce is useful in a wide range of applications, including distributed pattern-based searching, distributed sorting, web link-graph reversal, machine learning, and statistical machine translation.

BRIEF DESCRIPTION OF THE DRAWINGS

The disclosure may be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
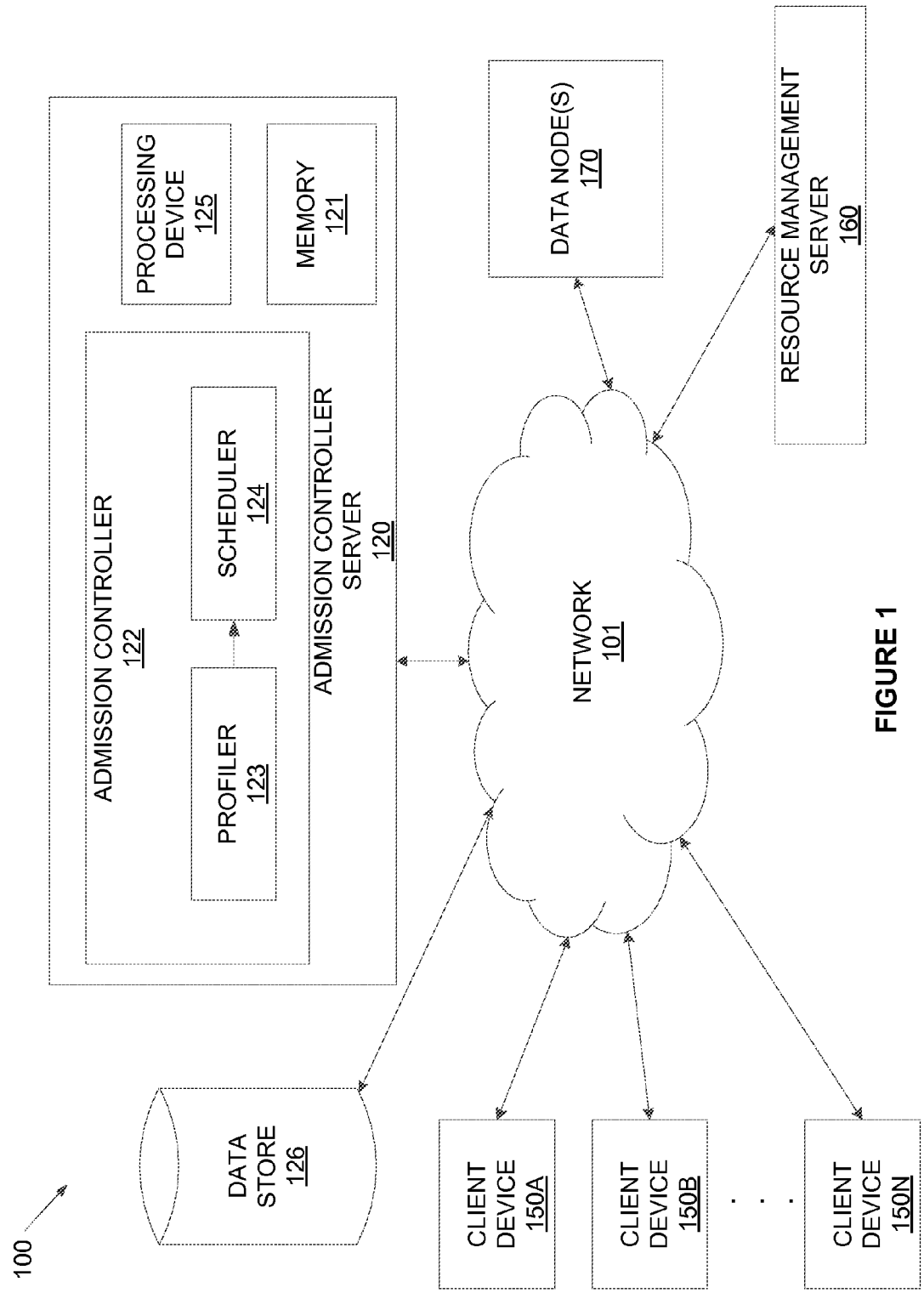
FIG. 1 is a block diagram of an example system architecture, in accordance with various implementations.

Systems and methods for scheduling multi-phase computing jobs are described. Computing jobs, such as MapReduce jobs, may be executed in multiple phases. A MapReduce framework scheduler schedules a job or a batch of jobs based on an availability of resources. Examples of resources include central processing unit (CPU) cores, memory size, storage input/output (I/O) bandwidth, and network bandwidth. A computing job may be a multi-phase computing job. The computing job may be executed in multiple phases and each phase may utilize certain amounts of one or more computing resources.

In determining an amount of a computing resource required for execution of a job, common scheduling implementations may ignore the multi-phase structure of the job, and may instead determine that the amount of the computing resource that is required for executing the job equals to the maximum, among all phases, amount of the resource required to execute individual phases of the job. If, for example, a first phase of a job requires fifty CPU cores and a second phase of the job requires only ten CPU cores, it may be determined that the entire job requires fifty CPU cores. Thus, a scheduler may reserve more resources than required to execute the job without regard to the multiple phases of the job. As the job phases are executed sequentially, i.e., one at a time, reserving the maximum, among all phases, amount of the resource may lead to underutilization of computing resources.

In scheduling computing jobs, a scheduler may communicate with a job profiler, which may be employed for defining computing job profiles. A job profile may define an amount of one or more resources required to execute multiple phases of the computing job.

The profiler receives a multi-phase computing job as its input. The profiler transforms the computing job into multiple phases required to complete execution of the computing jobs. The phases may be declared by a job and included in the job's metadata. Therefore, the profiler can retrieve the phase declaration of a job from the job's metadata. The profiler may alternatively receive the information describing phases of a job from the compiler that has produced one or more executable modules associated with the job. The profiler then specifies an amount of one or more resources required to execute each of the multiple phases of the computing jobs into a job profile of the computing job. The profiler may also specify a type of the job (i.e., a job type) in the job's profile. A completed job profile that is output for a computing job provides multiple phases of the computing job. The job profile specifically outputs, for each phase, an amount of one or more resources estimated to execute the phase. The job profile is provided by the profiler to the scheduler. The profiler may receive, along with a request for execution of a job, a job type. The profiler may receive a starting address corresponding to the requested job along with a list of parameter values (including, for example, the job type) of a data structure of the requested job. The profiler splits a job into multiple phases based on a job type and creates multiple job phase definitions where a phase of a job is associated with a job phase definition.

The scheduler receives a job profile of a computing job that is to be executed. The scheduler analyzes the job profile and calculates an amount of one or more resources needed for execution of each phase. The amount of resources needed to execute a computing job in one phase may differ from an amount of resources required to execute another phase.

The scheduler may append an identifier of each of the computing jobs to a job queue. The identifier may be a unique numeral identification or other type of identification associated with and identifying a job. The job queue is a data structure comprising all of the jobs that require scheduling. The job queue may be implemented as a linked-list that accumulates all the jobs that require scheduling and the jobs can be inspected in random order.

After one or more jobs are placed in the job queue by the scheduler appending a respective identifier of the respective computing job to be executed, the scheduler may select a combination of one or more computing jobs to be scheduled from the job queue. The scheduler then removes the computing jobs from the job queue. The scheduler determines a total amount of a computing resource to be consumed at each of one or more consecutively executed phases of the computing jobs. In order for the job to be scheduled for execution, the total amount should not exceed a threshold resource amount of available computing resources. If however, the total amount exceeds the threshold resource amount, the combination of jobs will not be scheduled, and each of the jobs in the combination of jobs is returned to the queue.

FIG. 1 is a block diagram of an example system architecture implementing the systems and methods described herein. The system architecture 100 may include one or more client devices 150A, 150B, . . . , 150N, an admission controller server 120, data store 126, one or more data nodes 170, and resource management server 160. One or more of the client devices 150A, 150B, . . . , 150N may be referred to herein as the client device 150. In one example, the client device 150 may be a computing device, such as a personal computer, personal digital assistant, laptop computer, tablet computer, etc. In one example, the admission controller server 120 may be a computing device such as, for example, a server computer, a desktop computer, a gateway computer or any other suitable computer system. The admission controller server 120 includes an admission controller 122 which includes a profiler 123 and a scheduler 124. The admission controller server 120 also includes a processing device 125 and a memory 121. Memory may include, but is not limited to, main memory such as, read-only memory (ROM), flash memory, dynamic random access memory (DRAM) (e.g., synchronous DRAM (SDRAM) or DRAM (RDRAM), etc.), and static memory (e.g., flash memory, static random access memory (SRAM), etc.). Data may be stored in the local storage (not depicted), such as local storage disks. In one example, the resource management server 160 may be a computing device such as, for example, a server computer, a desktop computer, a gateway computer or any other suitable computer system. In one example, the data nodes 170 may be any data processing device, such as a desktop computer, a laptop computer, a mainframe computer, a personal digital assistant, a server computer, a hand-held device or any other device configured to process data. In an implementation, the data nodes 170 may be combined into a computer cluster comprising a set of interconnected computers or nodes.

The client device 150, the admission controller server 120, the data store 126, the data nodes 170, and the resource management server 160 may be coupled to a network 101. The data store 126 may be a storage device accessible via the network 101 and may store job profiles associated with jobs. The data store 126 may be a network attached storage file system that includes any number of mass storage devices, such as magnetic or optical storage based disks, solid-state drives (SSDs) or hard drives. The data store 126 may be cloud storage or another type of storage. In an implementation (not depicted), the data store 126 may be located within the admission controller server 120.

Responsive to receiving a user interface command indicative of a submission of a job, the client device 150 submits the job to the admission controller server 120, via network 101. In another implementation, the job may be submitted by another process running on the computer system. The following provides an example of a job submitted to the scheduler. The job may require a data sort operation on a very large database using MapReduce. A data sort operation may create an order of the items included in the database by arranging the items in a sequence ordered by a particular criterion (e.g., chronological ordering, alphabetical ordering in ascending/descending order, etc.). A data sort may also create a grouping of items with similar properties. The job may be submitted, including data corresponding to the database, to admission controller server 120, via network 101 from client device 150. The admission controller 122 inputs the job into the profiler 123. The profiler 123 creates a job profile for the job by separating the job into phases, and transmits the job profile to the scheduler 124. The scheduler 124 batches this job with other jobs to create a combination of jobs that optimizes a certain resource scheduling criterion. Two or more jobs in the combination of jobs may be combined as a result of the scheduler analyzing each job's profiles and selecting jobs such that the combination of the jobs optimizes a certain resource scheduling criterion. The resource scheduling criterion may be provided by a function of an amount of the computing resource that should remain unassigned to any of the computing jobs of the selected combination. The scheduler 124 receives information regarding available resources from the resource management server 160 and determines if there are enough available resources to execute the combination of jobs. The scheduler 124 may then determine to accept or reject the combination of jobs based on a comparison between the resources estimated to complete the combination of jobs and the available resources.

If a combination of jobs satisfies the resource scheduling criterion, the scheduler 124 transmits the individual jobs in the combination of jobs to the data nodes 170. The data nodes 170 execute the jobs in parallel.

The client device 150, the data store 126, the admission controller server 120, the data nodes 170, and/or the resource management server 160 may be coupled via the network 101 that communicates any of the standard protocols for the exchange of information. Some or all of client device 150, the data store 126, the admission controller server 120, the data nodes 170, and the resource management server 160, may be connected to a Local Area Network (LAN) and may be incorporated into the same physical or logical system, or different physical or logical systems. Alternatively, some or all of the client device 150, the data store 126, the admission controller server 120, the data nodes 170, and the resource management server 160 may reside on different LANs that may be coupled together via the Internet but separated by firewalls, routers, and/or other network devices. In yet another configuration, some or all of the client device 150, the data store 126, the admission controller server 120, the data nodes 170, and the resource management server 160 may reside on a server, or different servers, coupled to other devices via a public network (e.g., the Internet) or a private network (e.g., LAN). The network 101 may be a public network, a private network, or a combination thereof. The network 101 may include a wireless infrastructure. The wireless infrastructure may be provided by one or multiple wireless communications systems, such as a Wi-Fi (e.g., IEEE 802.11) hotspot connected with the network 101 and/or a wireless carrier system that may be implemented using various data processing equipment, communication towers, etc. Various other network configurations may be used including, for example, hosted configurations, distributed configurations, centralized configurations, etc. Each node of a computer cluster may be connected to another node of the same cluster or to other nodes of different clusters via the network 101 in the same manner as described above.

Each data node 170 may have its own physical or virtual memory, and/or storage, and processors, etc. Each data node 170 may execute at least some of the phases or a computing job. A single computing job or a combination of one or more jobs may run on one or more nodes 170 in parallel.

The client device 150 may host various applications, including, for example, web applications, desktop applications, browser applications, etc. In one implementation, an application may be an interface application (not shown). The interface application may allow a user of a client machine to send a job to be processed and may receive a result of an executed job. In an implementation, the interface may be a job-reduce interface application and the job may be a MapReduce job. The MapReduce interface application may allow the client device to interact with the admission controller server 120, via the network 101. The MapReduce interface application may allow a user employing the client device 150 to submit a MapReduce job to the admission controller server 120, via the network 101. The admission controller server 120 provides the MapReduce job to the admission controller 122. The profiler 123 of the admission controller 122 creates a job profile for the MapReduce job and communicates the job profile to the scheduler 124 to schedule the job. The job profile includes multiple job phase definitions, where a phase of a job is associated with a respective job phase definition.

Figure 2:
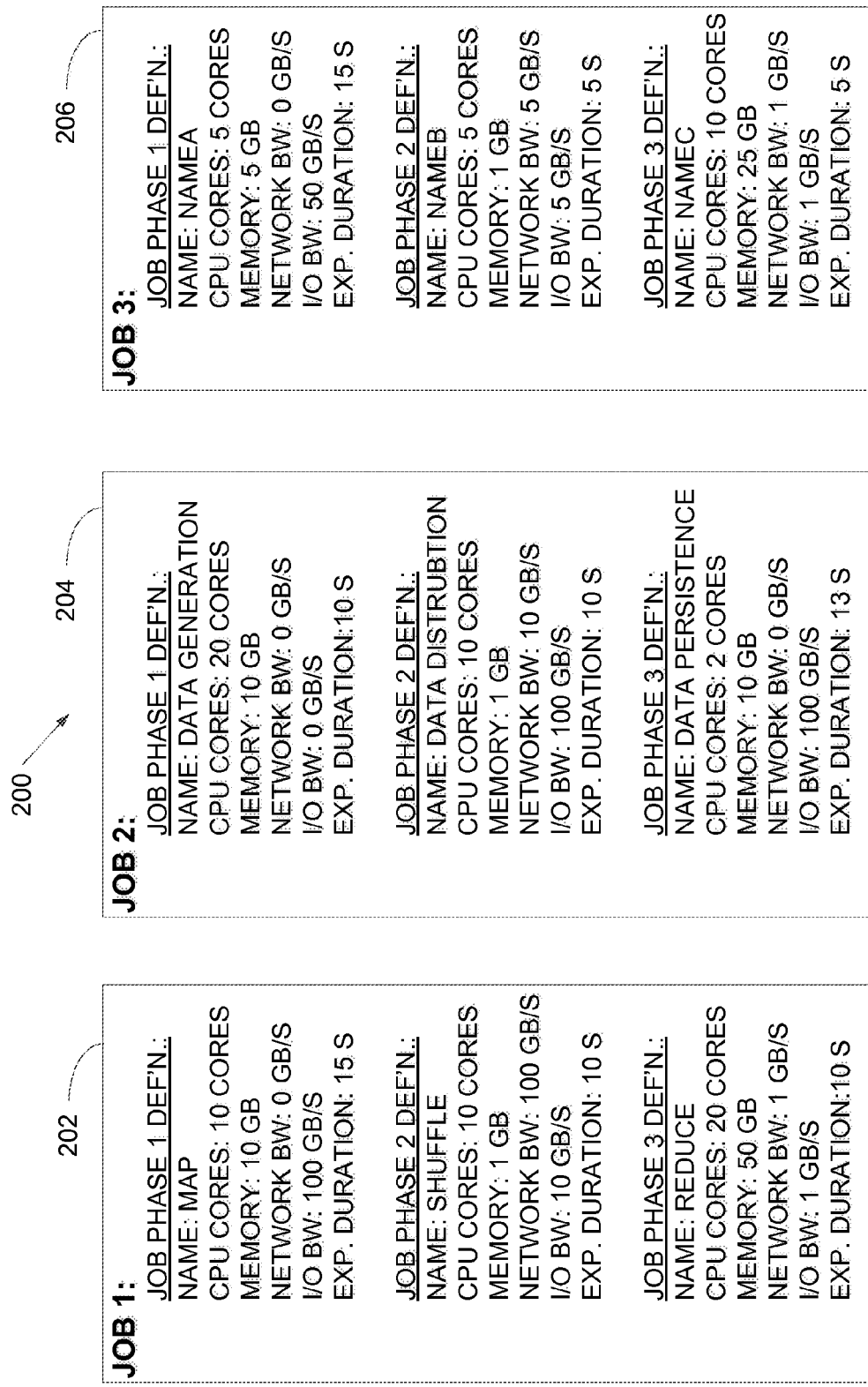
FIG. 2 is a block diagram illustrating an example of job profiles, according to an implementation of the disclosure.
Figure 3:
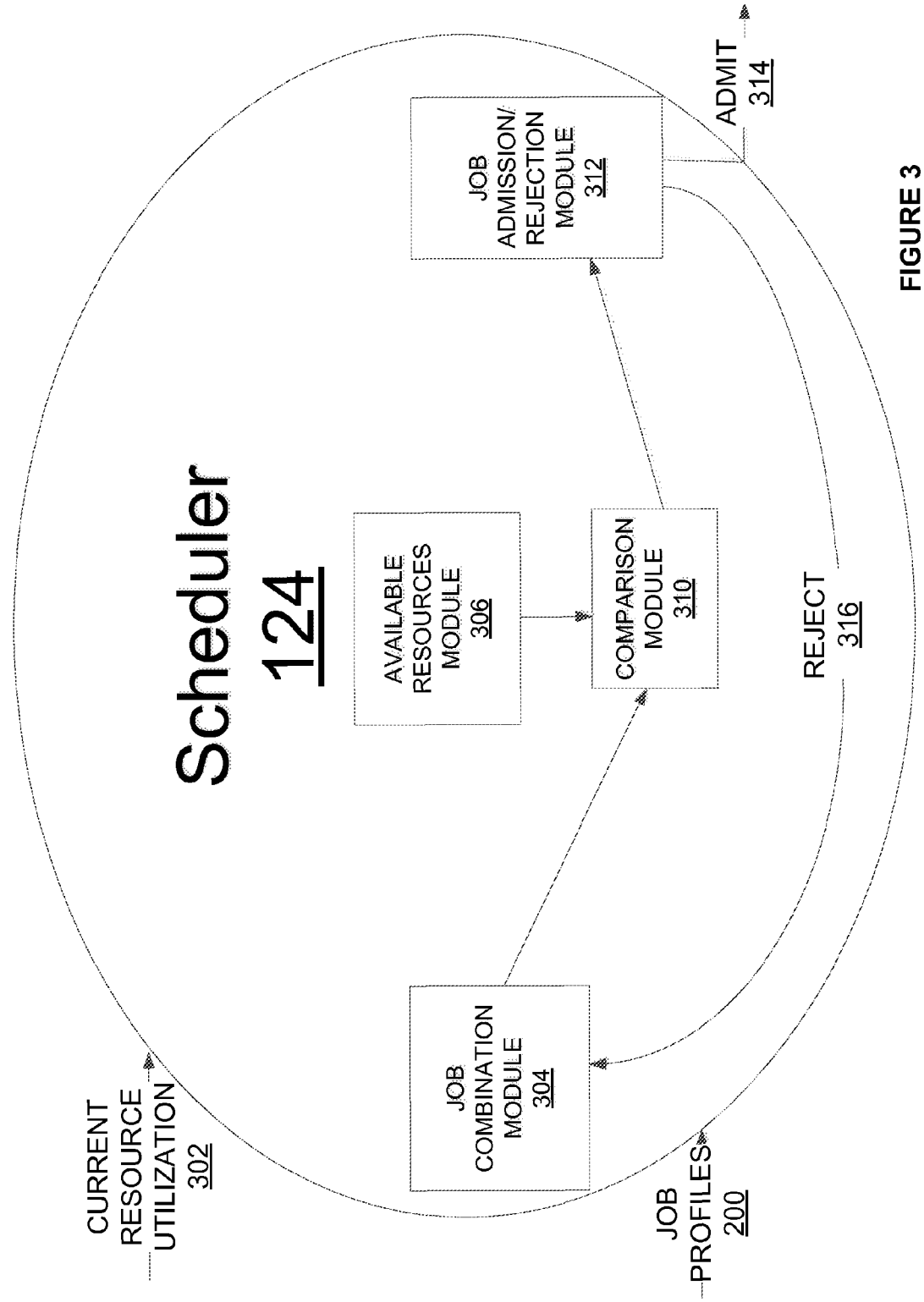
FIG. 3 is a block diagram illustrating an example of a scheduler, according to an implementation of the disclosure.
Figure 4:
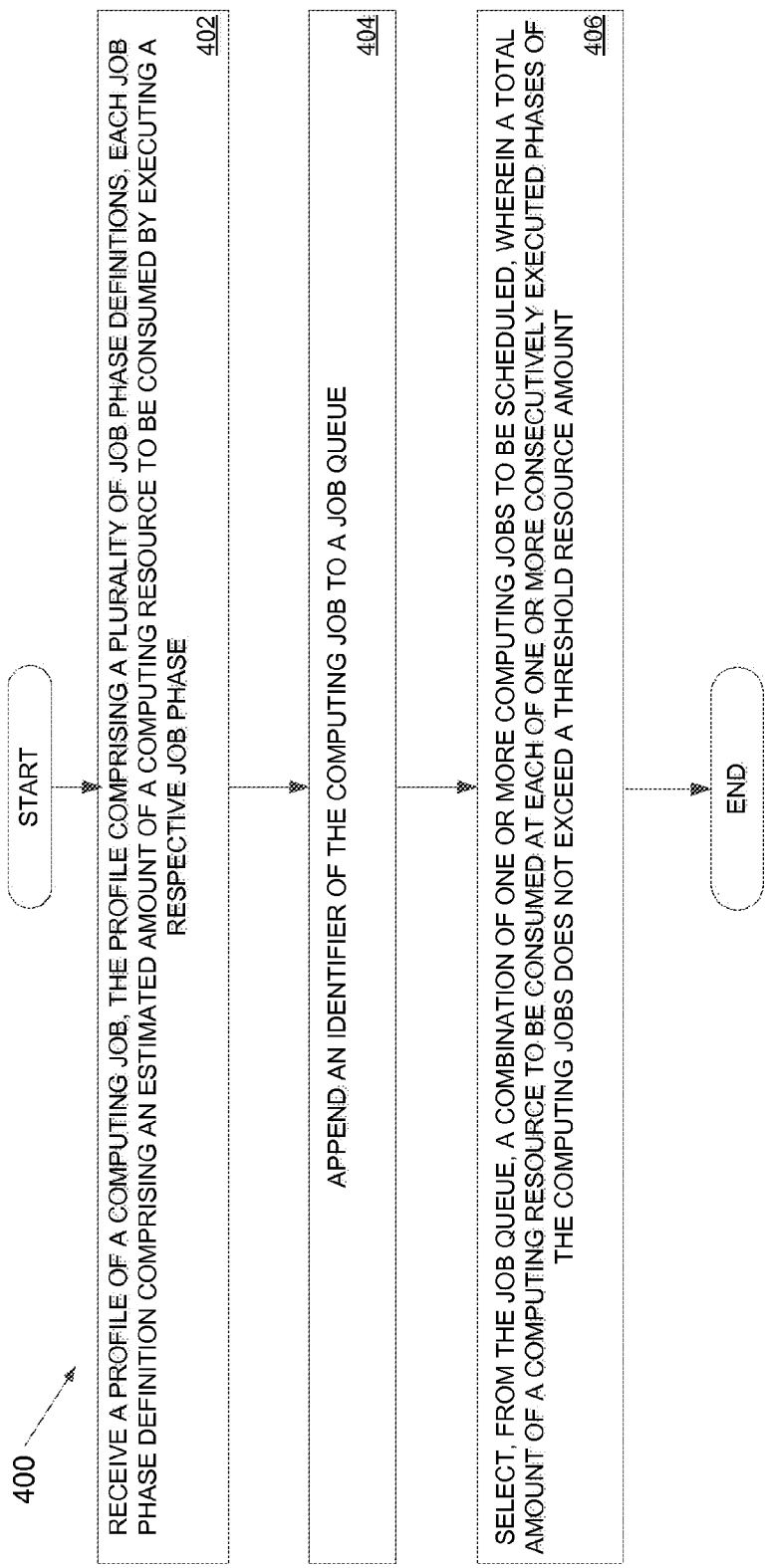
FIG. 4 is a flow diagram illustrating an example method for selecting, from a job queue, a combination of one or more computing jobs to be scheduled, according to an implementation of the disclosure.

The admission controller 122 is discussed in more detail in regards to FIGS. 2-4.

Although a job may be described as a MapReduce job, any job may be submitted and carried out/executed. For brevity and simplicity, the term job is used throughout. However, the terms job and computing jobs may be used interchangeably.

Scheduling two or more computing jobs without considering the resource consumption by job phases may lead to reserving more computing resources that are actually needed for executing the jobs, and thus to the overall underutilization of the computing resources. The following describes an example of over-estimation of computing resources. If Job 1 consists of two phases and requires ten units of a certain computing resource to complete each phase, then it may be determined that the maximum amount of units of the computing resource is twenty (10+10). Therefore, twenty units of the computing resource must be available and reserved to complete Job 1. However, phase one may be executed first followed sequentially by phase two. Therefore, only ten units of the computing resource is needed to perform phase one of Job 1, and ten units of the computing resource is needed to perform phase two of Job 1. Therefore, dedicating twenty units of the computing resource to perform Job 1 may lead to an over-estimation of the computing resources. Suppose there is a second job, Job 2, for which a maximum amount of units of a computing resource is also twenty. When Job 1 is combined with Job 2 so both jobs can be executed in parallel, it may be determined that a total of forty units of the computing resource must be dedicated to execute the combination of Jobs 1 and 2. Thus, in common implementations, one or more jobs may be scheduled without taking into consideration multiple phases of the jobs. The scheduling of jobs may be performed by determining an amount of a resource that is needed to execute the entire job, without taking into account that jobs may not consistently consume the same amount of resources at multiple phases of job performance. That is, some phases of a job may utilize more or less resources than other phases and scheduling jobs in this manner may lead to over-estimation of computing resources.

Different phases of a job may utilize different amounts of one or more computing resources. For example, in a MapReduce job, during a map phase, input/output may be more intensive than at any other phase, during a shuffle phase, network bandwidth may be used more than at any other phase, and, during a reduce phase, central processing units (CPUs) may be used than any other phase. If a scheduling framework uses an overall resource consumption profile without considering the multiple phases of a job, the utilization of resources may not be optimized. Moreover, when combining multiple jobs to be executed in parallel, resource consumption inefficiency may further be increased.

The following provides an example of over-utilization of resources. Suppose that a MapReduce server receives two MapReduce jobs from one or more users employing client machines. A first MapReduce job requires ten units of a computing resource to execute each of two phases of the first job. The second MapReduce job requires twenty units of the computing resource to execute each of two phases of the second job. A scheduler running on the MapReduce server machine combines the first and second jobs into one so that the jobs may be executed in parallel. The scheduler identifies whether to admit or reject the combination of MapReduce jobs by evaluating the availability of resources. If in the above example, only thirty-five units of the computing resource are currently available, the combination of MapReduce jobs will be rejected by the scheduler. However, more than thirty-five units of the computing resource are not needed to execute the phases of the combination of MapReduce jobs. Rather, thirty units of the computing resource are required for each phase of the combination of MapReduce jobs because ten units are needed for all of the phases of the first job and twenty units are needed for all of the phases of the second job. Therefore, although the scheduler rejects the combination of MapReduce jobs, the combination of jobs can be completed with the available amount of computing resources.

In an implementation, the profiler may determine resource utilization for multiple phases of a job based on previously executed jobs. Data nodes may provide the profiler with information regarding an amount of resources that were used in particular phases of jobs that were previously executed. Based on this information, the profiler may generate job phase definitions for each phase of a job. The job phase definitions may be retrieved from introspecting jobs or from characterization of historical job runs. Each phase of a job may be associated with a subtask of a job. The subtask of the job is to be completed within the phase of the job. A job may also be executed repeatedly. For a job that may be executed repeatedly, the job phase definitions of the job may be obtained by examining run resource consumption patterns of the previously executed job. If a current job type is a MapReduce job, previously executed MapReduce job information may be analyzed in determining an estimated amount of resources for a map phase, a shuffle phase and a reduce phase of the job. The estimated amount of resources is used to generate the profile for the job and the job profile is provided to the scheduler. Thus, instead of determining an amount of resources required to execute the entire job (without taking the phases into account), the scheduler allows for an accurate determination of the amount of resources required for each phase.

Additionally, a profile of a job may include an expected duration time field input. A job phase definition of a phase of the job may include the expected duration time field. An expected duration time may be an estimated time required to complete a phase of the job. The expected duration time may be determined based on past completed jobs. The profiler may communicate with data nodes or a resource management server that keeps track of complete jobs. The profiler receives, from the data nodes, one or more descriptions of completed jobs. The profiler may compile the received descriptions of completed jobs into a database. The database may include a list of the past completed jobs, an amount of resources utilized in execution of each phase of the past completed jobs, and completion times of the execution of the phases. In an implementation, in order to calculate the expected duration time for a phase of a current job that has not yet been executed, the amount of resources required for the phase may be compared with other phases of jobs that have been completed in the past. For the current job, the profiler may find one or more similar past completed job phase(s), where the similar past completed jobs have an amount of resources in a close range as the current job's amount of resources. Similar past completed jobs may have utilized a similar amount of resources in one or more executed phases as the current job's one or more phases. The profiler may define a close range as a threshold percentage. For example, if a phase of a current job utilizes ten units of a certain resource, similar past completed job phases may be defined as jobs that have completed phases which utilized units within a percentage of the ten units. The phase execution time(s) of similar past completed job phases are used in determining an estimated duration time of the current phase of the job. Similar estimations may be made for each phase of the job.

The completed job profile lists a plurality of job phase definitions, where each job phase definition includes an estimated amount of computing resource(s) to be consumed by executing a respective job. The profile job phase definition of a phase includes an amount of resources and an expected duration time needed to execute the phase. The completed job profiles for one or more jobs are sent to a scheduler. The scheduler combines two or more of the jobs that are to be executed in parallel. The scheduler determines to combine two or more jobs by analyzing each job's profiles and selecting jobs such that the combination of the jobs optimizes a certain resource scheduling criterion. The scheduler may perform multiple iterations to cycle through all possible job combinations or limit the combinations by defining a certain resource scheduling criterion. The scheduler can then determine whether to admit or reject the combination of two or more jobs. By scheduling a combination of jobs based on the multiple phases of each job in the combination, the scheduler may provide robust Quality of Service (QoS) and overload control. Robust QoS is provided when a majority of QoS goals are consistently met by the scheduler. Overload control is provided when the scheduler's performance is not deviated excessively under a heavy load.

The scheduler extracts the amount of resources required to complete each phase of a job and the expected duration time estimated to execute each phase of the job from a job profile (which the scheduler receives from the profiler). The scheduler compares various job profiles and combines two or more of the jobs into a single combination of jobs. Prior to submission of the combination of jobs, the scheduler determines if it may be feasible to execute the two or more jobs, in the combination of jobs, in parallel. The scheduler combines the jobs based on a certain criterion based on information extracted from the job profiles. A metric may be employed to measure a degree of similarity between a first job and a second job. The metric may define a threshold for an expected duration time. If an expected duration time for one phase falls within the threshold, then that phase may be combined with another phase. For example, a first job may have a phase with an expected duration that is within a threshold for an expected duration for another phase of a second job. Thus, the combination of the phase of the first job with the phase of the second job minimizes underutilization of resources as the amount of resources reserved for an expected duration time for execution of the first job is substantially similar to the amount of resources reserved for an expected duration time for execution of the second job. A difference of the first estimated duration and a second estimated duration may fall below a certain threshold. In another implementation, a first job may be combined to be executed in parallel with multiple jobs.

The scheduler also receives, from data nodes or a resource management server in communication with the data nodes, a list of available resources that are available for execution of jobs. The list of available resources may be managed by a resource management server that accumulates all the available resources in all data nodes that execute jobs. The list may be provided to the scheduler by the resource management server. In another implementation, the list of available resources may be transmitted directly to the scheduler by one or more data nodes that are used to execute jobs.

The scheduler combines two or more jobs into a combination of jobs and may schedule execution of each of the combination of jobs in parallel. For the combination of jobs, the scheduler, based on certain resource scheduling criterion, compares the amount of resources required to execute the combination with the list of available resources. If the result of the comparison indicates that the combination of jobs utilizes less than or the same amount of resources than are available, the scheduler may admit the job. If the result of the comparison indicates that the combination of jobs utilizes more than the amount of resources that are available, the scheduler may reject the job. The scheduler takes the multiple phases of the jobs in consideration when performing the comparison. The scheduler may also compare the expected duration time estimated to execute a phase in a first job with other phases of other job(s) to find duration times that are substantially similar to the expected duration time of the phase in the first job.

A combination of jobs that is admitted is forwarded to data nodes that have a capacity to execute the combination of jobs.

FIG. 2 is a block diagram illustrating example job profiles 200. A job profile may be represented as a data structure that is associated with a job. The job profile may be a part of the job's metadata. The job profiles 200 include a job profile 202 for Job 1, a job profile 204 for Job 2 and a job profile 206 for Job 3. The job profiles 200 are generated by the profiler 123 of admission controller 122 in FIG. 1. Each job, for which a job profile may be generated, may be submitted to the admission controller server 120 by the client device 150, via the network 101. Each job may be a multi-phase computing job.

The profiler 123 divides each job into multiple phases. The profiler 123 may analyze a job's metadata in order to find the phase declarations of the job. The profiler 123 may specify a job type of a job in the job's profile. An example of a job type is MapReduce. Suppose that a user, via user device, requests execution of a MapReduce job. The user may provide the job type (i.e., MapReduce) to the profiler 123 when requesting execution of the job. The profiler 123 may receive a starting address corresponding to the requested job along with a list of parameter values (including, for example, the job type) of a data structure of the requested job. The profiler 123 splits the job into multiple phases based on the job type. In the following illustrative example, it is described how a job may be split into multiple phases. A job type of Job 1 may MapReduce. The profiler 123 may divide Job 1 into three phases based on the job type. Each phase may be associated with a respective job phase definition. For example, a first job phase may be associated with a first job phase definition, and a second job phase may be associated with a second job phase definition. One of job phase one's definition may be a name. The name of job phase one's definition may be map. Similarly, job phase two's definition name may be shuffle and job phase three's definition name may be reduce. The profiler 123 determines which resources and an amount of the resources in a job phase definition are required in order to complete a phase of a job. Resources include, for example, CPU cores, memory size, storage input/output (I/O) bandwidth, and network bandwidth. The profiler 123 also determines a duration time expected to complete each phase of the job. The expected duration time is input into a job phase definition of a job. Inputting these fields into a profile for a job phase definition allows determination of multi-dimensional factors.

The profiler 123 transmits the job profiles to the scheduler 124 in FIG. 1. When these profiles are provided to the scheduler 124 in FIG. 1, the scheduler may perform a data sort of the jobs and combine one or more of the jobs into a combination of jobs and determine whether to accept or reject the combination of jobs. To sort the jobs, the scheduler 124 may analyze the profiles of the jobs. The data sort may be performed on an amount of resources utilized per phase, estimated completion times of phases, etc. In an implementation, the scheduler may perform multiple iterations to cycle through all possible job combinations. In another implementation, the scheduler may use brute force cycling to cycle through all possible job combinations. In another implementation, the scheduler may perform a data sort of the jobs in order to determine which jobs should be combined with other jobs to form a combination of jobs. In another implementation, the scheduler may use a certain criterion in order to determine which jobs should be batched together. In one example, the scheduler may decide to combine a first job with a second job because the phases of each of the first and second jobs utilize the same resource. In another example, the scheduler may decide to combine a first job with a second job because the phases of each of the first and second jobs have substantially similar expected duration times. In an implementation, in order to reduce a number of iterations performed by the scheduler, the scheduler may analyze an importance criterion. The scheduler may evaluate jobs that are associated with a higher order of importance before evaluating jobs that are associated with a lower order of importance. Therefore, the scheduler may combine jobs that are associated with a higher order of importance before combining jobs that are associated with a lower order of importance.

In an implementation, each job may also have an associated priority. A user that requests execution of a first job may wish to assign a high priority to that job. The same user or a second user may request a second job that has a medium priority. Another job that is requested may have a low priority. The scheduler may perform a data sort to combine two or more jobs that have similar priorities. The combination of jobs that have high priorities may be executed before jobs having lower priorities.

The following describes an example of a scheduler that does not take into consideration the multiple phases of jobs when combining the jobs. Suppose that the scheduler 124 determines to combine Job 1 and Job 2 in FIG. 2 into a combination of jobs. If each of the jobs were not divided into phases, the computing resources estimated to execute the combination of jobs (Job 1 and Job 2) in FIG. 2, would be as follows: {40 CPU cores, 60 GB memory, 110 GB/s network bandwidth; 200 GB/s I/O bandwidth}. The above calculation does not take into consideration the multiple phases of each of the jobs. Therefore, for Job 1, the scheduler 124 may determine, by analyzing the respective job profile of Job 1, that 20 CPU cores would be required because that may be the maximum amount of cores required in all three of the phases. For Job 2, it would also be determined 20 CPU cores would be required because that may be the maximum amount of cores required in all three of the phases. The CPU cores required for the combination of jobs (Job 1 and Job 2) would be 20+20=40 CPU cores. Similarly, the memory required for Job 1 would be 50 GB. The memory required for Job 2 would be 10 GB. Therefore, the memory required for the combination of jobs (Job 1 and Job 2) would be 50+10=60 GB. The network bandwidth (BW) required for the combination of jobs (Job 1 and Job 2) would be 100+10=110 GB/s. The I/O BW required for the combination of jobs (Job 1 and Job 2) would be 100+100=200 GB/s.

However, suppose that a job profile of a job indicated multiple phases of a job and the amount of resources required per phase, as depicted in FIG. 2. The scheduler would determine the CPU cores of phase one for Job 1 (10 cores), provided in the job phase definition associated with phase one of Job 1, and add it to the CPU cores for phase one for Job 2 (20 cores), provided in the job phase definition associated with phase two of Job 2. For the combination of jobs (Job 1 and Job 2), the scheduler would determine the following. The calculation of Job 1's resources and Job 2's resources (which are added together) are shown in parenthesis.

{Phase 1:
(10+20)=30 CPU cores
(10+10)=20 GB memory
(0+0)=0 GB/s network BW
(100+0)=100 GB/s I/O BW
Phase 2:
(10+10)=20 CPU cores
(1+1)=2 GB memory
(100+10)=110 GB/s network BW
(10+100)=110 GB/s I/O BW
Phase 3:
(20+2)=22 CPU cores
(50+10)=60 GB memory
(1+0)=1 GB/s network BW
(1+100)=101 GB/s I/O BW}

Additionally, the expected duration time included in the job profiles may also be used for resource allocation. For phase one, Job 1 and Job 2 require an expected duration time of fifteen seconds and ten seconds, respectively. For phase two, Job 1 and Job 2 require an expected duration time of ten seconds and ten seconds, respectively. For phase three, Job 1 and Job 2 require an expected duration time of ten seconds and thirteen seconds, respectively. As the first phase of Job 1 has a substantially similar expected duration time as the first phase of Job 2, the scheduler may determine to combine these phases of these jobs into a combination of jobs. Similar comparisons between the other phases of Jobs 1 and 2 may be performed in order to combine at least the phases of the jobs into a combination.

In order to create a multi-dimensional array, including expected duration time, for the combination of jobs (Job 1 and Job 2), the scheduler would extract the amount of resources required to complete each phase of each job from the respective job profiles. The scheduler would also extract an expected duration time estimated to execute each phase of each job from the respective job profile. The scheduler would then determine an amount of resources required to execute the combination of jobs based on the extracted information from the job profiles (of Job 1 and Job 2). The scheduler would analyze each of the job's profiles and add the amount of resources to execute each of the jobs. The scheduler would determine the amount of resources for the combination of jobs as described in the above. The scheduler would determine that for the combination of jobs, the following resources need to be allocated: 30 CPU cores, 60 GB memory, 110 GB/s network BW, and 110 GB/s I/O bandwidth. This determination indicates that for any phase of the combination of jobs, a maximum of 30 CPUs are required, 60 GB memory may be required, etc. Therefore, instead of allocating a one-dimensional resource array of {40 CPU cores, 60 GB memory, 110 GB/s network bandwidth; 200 GB/s I/O bandwidth}, a multi-dimensional array based on multiple phases of jobs provides for a more accurate and efficient allocation of resources.

FIG. 3 is a block diagram illustrating an example of a scheduler, according to an implementation of the disclosure. The scheduler 124 in FIG. 3 is a detailed version of the scheduler 124 depicted in FIG. 1. The scheduler 124 includes a job combination module 304, an available resources module 306, a comparison module 310, and a job admission/rejection module 312. The scheduler 124 receives job profiles 200 as an input. The job profiles 200 may be transmitted by the profiler 123 in FIG. 1. The job profiles 200 may be the same job profiles depicted in FIG. 2 or different job profiles.

In an implementation, the profiler 123 may provide a completed job profile to the scheduler as soon as it may be created. In another implementation, the profiler stores one or more completed job profiles in the data store 126 and the job profiles are sent to the scheduler 124 on a predetermined schedule (e.g., every five minutes, etc.). In yet another implementation, the profiler 123 stores job profiles in the data store 126 and when a target number of job profiles are stored, the job profiles are provided to the scheduler. Other implementations of providing the job profiles to the scheduler may be used.

The scheduler 124 also receives current resource utilization 302 as an input. The current resource utilization 302 may be transmitted by the resource management server 160, via the network 101 in FIG. 1. The scheduler 124 may output an admitted combination of jobs 314. In an implementation, the output admitted combination of jobs may be provided to data nodes 170, via the network 101, in FIG. 1 for execution.

After the scheduler 124 receives the job profiles 200, the scheduler 124 provides them to the job combination module 304. The job combination module 304 determines, based on a criterion, which of the plurality of jobs (associated with the received job profiles) to combine into a combination of jobs. The job combination module 304 analyzes all of the job profiles that have not been scheduled. The job combination module 304 cycles through at least a subset of a combination of all of the jobs as follows. The job combination module 304 selects a best combination of the subset of jobs based on a criterion. The criterion may be based on a similarity between the jobs. The similarity may exist between phases of a job (e.g., between a first phase of a first job and a first phase of a second job).

Another example of a criterion that indicates a similarity which is used to batch jobs is describes as follows. If a first and second job require more of a first type of resource in phase one and less of a second type of resource in phase two, as provided in their respective job phase definitions, the jobs are combined into a combination of jobs. In another example, if two or more jobs have the same job type, job priority, and/or have the same number of phases required to execute the respective job, the two or more jobs may be batched into a combination of jobs.

The job combination module 304 may determine not to combine two or more jobs if an amount of a resource, a duration time, etc., of one or more of the jobs do not meet a particular threshold. The job combination module 304 may return one or more of the jobs that are not combined into a combination to a job queue of unscheduled jobs. The job combination module 304 may cycle two or more other jobs from the job queue and the cycle may repeat until all jobs in the queue are scheduled.

The job combination module 304 may compare two or more jobs based on a second criterion. The second criterion may be the expected time duration required to complete a phase of a job. The job combination module 304 may cycle through all the jobs in the queue and select two or more jobs to combine into a combination of jobs based on the second criterion. If a first phase of a first job has a substantially similar expected duration time as a first phase of a second job, then the first and second jobs may be combined into a combination of jobs. In this way, the phases of these jobs having substantially similar expected duration times may be executed in parallel.

The job combination module 304 may determine not to combine two or more jobs if they do not optimize a certain resource scheduling criterion. The scheduler may cycle through a subset of all possible combinations and select a best combination based on a particular criterion (described above). If a combination of jobs is determined to consume an amount of a resource that exceeds an available amount of the resource, then the scheduler regards the combination as invalid. Therefore, the scheduler may select combinations of jobs that do not require more resources than the amount that is available.

The combination of jobs is provided to the comparison module 310.

The available resources module 306 receives the current resource utilization 302 input and is provided to the comparison module 310. In an implementation, the available resource module 306 may receive a new current utilization input every time a combination of jobs may be scheduled. In another implementation, the available resource module 306 may receive a new current utilization input periodically. Thus, the available resources may be dynamically updated.

The comparison module 310 extracts, from a job profile, an amount of resources required to execute each phase of a job in the combination of jobs. The comparison module 310 then determines an amount of resources required to execute the combination of jobs in view of the extracted amount of resources.

The comparison module 310 then compares the amount of resources required to execute the multiple phases of the combination of jobs with the available resources. The comparison module 310 then determines whether enough resources are available to execute the phases in the combination of jobs.

The comparison module 310 provides, to the job admission/rejection module 312, an indication of whether enough resources may be available for execution of the phases of the combination of jobs. If enough resources are available, then the job admission/rejection module 312 admits the combination of jobs. Otherwise, if enough resources are unavailable, the job admission/rejection module 312 rejects the combination of jobs. If the combination of jobs is admitted, the job admission/rejection module 312 outputs an admitted combination of jobs 314. If the combination of jobs is rejected, the job admission/rejection module 312 issues a "reject" 316 output and the rejected jobs may be returned back to the job combination module 304 so that they can be rescheduled.

In an implementation, after jobs are returned for rescheduling, the job combination module 304 may separate the combination of jobs and create a new combination for the separated jobs and any other jobs that may have come in. In another implementation, the job combination module 304 may separate the combination of jobs and create a new combination for the separated jobs by combining any of the jobs with older unscheduled jobs. In yet another implementation, the job combination module 304 may determine that one or more jobs cannot be combined (for example, if a job requires a great amount of resources such that it cannot be combined with other jobs). The job combination module 304 may then submit an individual job (that may not be combinable with others) to the comparison module 310 so that it may be scheduled to be executed by itself.

In an implementation, the scheduler 124 does not allow for over-commitment of resources. That is, the scheduler 124 does not schedule jobs when the amount of resources required is greater than the amount of available resources.

FIG. 4 is a flow diagram illustrating an example method for scheduling jobs using multi-dimensional admission control, according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by admission controller 122 of FIG. 1. In another implementation, method 400 is performed specifically by the scheduler 124 of FIG. 1 and FIG. 2.

Method 400 begins at block 402 where the processing logic receives a profile of a computing job. The profile comprises a plurality of job phase definitions. A job phase definition comprises an estimated amount of a computing resource to be consumed by executing an associated job phase. An example of a computing job may be Job 1, Job 2, or Job 3, as shown in FIG. 2. An example of a corresponding profile of the computing job may be job profile 202, job profile 204, or job profile 206.

Method 400 continues to block 404 where the processing job appends an identifier of the computing job to a job queue. The job queue lists all of the jobs that require scheduling. The identifier may be a unique numeral identification or other type of identification associated with and identifying a job. For example, the identifier may be a numerical or alphabetical code assigned to the computing job. In another example, the identifier may be a name of the job, as identified in the computing job's profile.

Method 400 continues to block 406 where the processing logic selects, from the job queue, a combination of one or more computing jobs to be scheduled. A total amount of a computing resource to be consumed at each of one or more consecutively executed phases of the computing jobs does not exceed a threshold resource amount. One or more computing jobs that are selected to be combined may include one or multiple computing jobs. The combination of jobs has a total amount of a computing resource that is to be consumed at each of the multiple consecutively executed phases of the computing jobs, and that total amount does not exceed a threshold resource amount. The threshold resource amount is a function of an amount of the computing resource that is available for scheduling. The amount of the computing resource that is available for scheduling may be received from data nodes 170 and/or resource management server 160. The amount of the computing resource may be dynamic and updated periodically and/or in real-time. Data nodes 170 and/or resource management server 160 may provide an amount of the computing resource that is available for scheduling (used in determining the threshold resource amount) to admission controller 122. The selected combination of the computing jobs is then scheduled by a scheduler.

In order for the scheduler to select the combination of computing job, the scheduler generates, in view of the profile, a plurality of computing job combinations, as described above with respect to FIG. 3. The scheduler then selects, from the plurality of computing job combinations, a combination that optimizes a certain resource scheduling criterion. The computing resource is provided by at least one of central processing unit cores, memory, network bandwidth, or input/output bandwidth. The resource scheduling criterion may be provided by a function of an amount of the computing resource that should remain unassigned to any of the computing jobs of the selected combinations. The computing resource is defined in the job phase definition(s) of the computing job. The scheduler optimizes a certain resource scheduling criterion such as utilizing a maximum amount of available computing resource(s). For example, if there are a thousand CPU cores available, then the resource scheduling criterion may indicate that a combination of jobs utilize as close to a thousand of the CPU cores that are available as possible. The scheduler may optimize another resource scheduling criterion such as an expected duration time for completion of a phase of a job. A phase of a job may have a first expected duration time that is substantially similar to a second expected duration time of another phase of another job. Based on this similarity, the phases of these jobs may be combined for execution in parallel with one another. In an implementation, the plurality of computing job combinations includes all valid combinations of computing jobs. The scheduler may use brute force or another optimized method in order to determine all combinations of computing jobs, which is used to combine one or more jobs into a combination of jobs. In another implementation, the plurality of computing job combinations comprises at least a subset of valid combinations of computing jobs. Determining the subset may exclude some of the combinations that may be included in the implementation where all of the combinations of computing jobs are determined. In this way, determining the subset may provide more optimized results than the determination of all valid combination.

Figure 5:
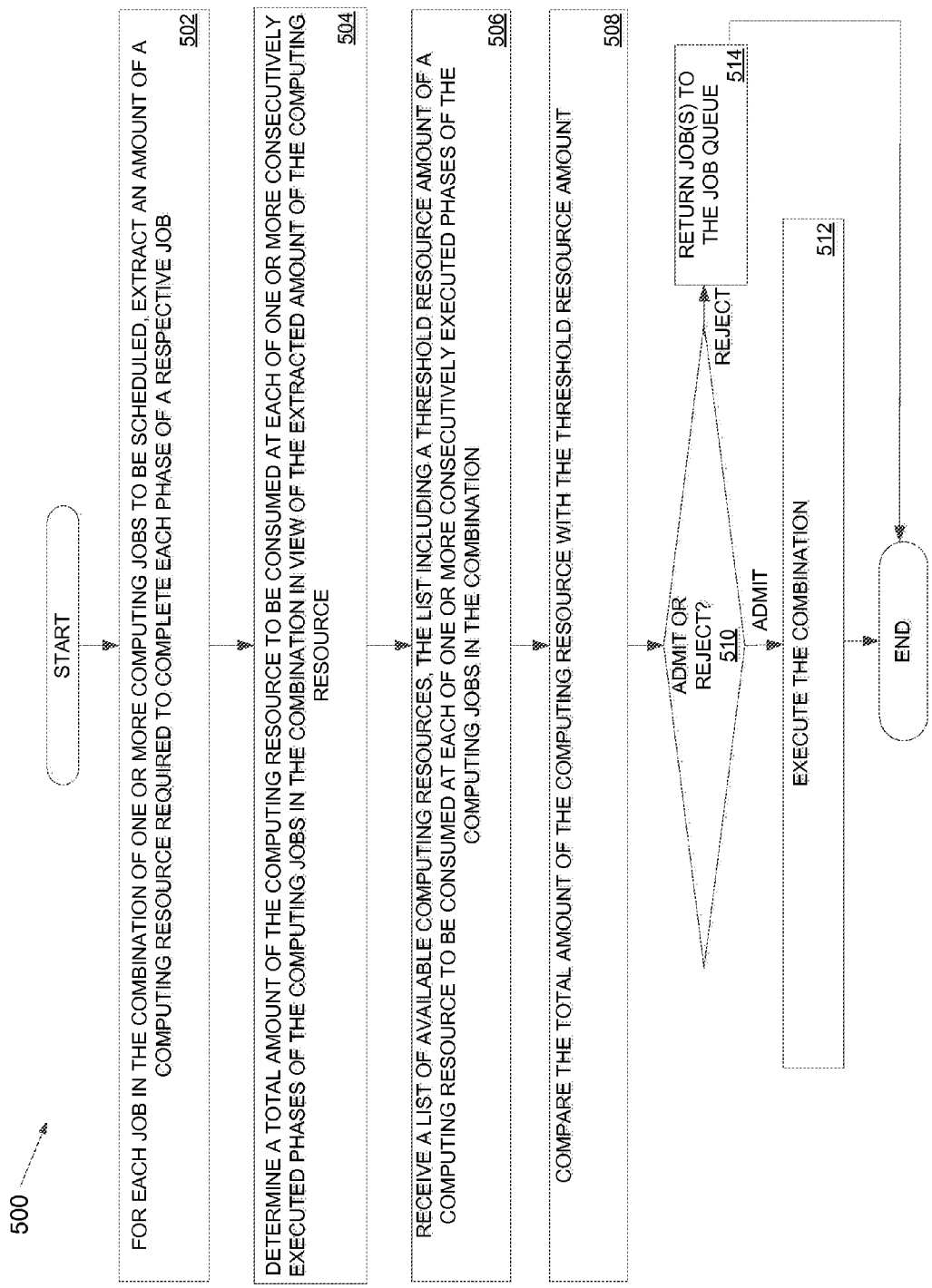
FIG. 5 is a flow diagram illustrating an example method for scheduling a combination of multi-phase computing jobs, according to an implementation of the disclosure.

FIG. 5 is a flow diagram illustrating an example method for scheduling a combination of multi-phase computing jobs, according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 400 is performed by admission controller 122 of FIG. 1. In another implementation, method 400 is performed specifically by the scheduler 124 of FIG. 1 and FIG. 2. FIG. 5 may provide further details regarding the selecting of a combination of computing jobs, as described in block 406 of FIG. 4.

Method 500 begins at block 502 where, for each job in the combination of one or more computing jobs to be scheduled (as determined in FIG. 4), the processing logic extracts an amount of a computing resource required to complete each phase of a respective job. The amount of the computing resource required to complete each phase may be included in a respective job profile of a respective job to be executed. For example, if the combination of jobs includes Job 1 and Job 2, an amount of a resource required to complete each phase (e.g., phase one, phase two, phase three) of each of Job 1 and Job 2 is extracted from their respective job profiles, 202 and 204 in FIG. 2.

Method 500 continues to block 504 where the processing logic determines a total amount of the computing resource to be consumed at each of one or more consecutively executed phases of the computing jobs in the combination in view of the extracted amount of the computing resource to execute the combination. For example, as described above with respect to FIG. 2, the total amount of a resource required to execute the combination of jobs (Job 1 and Job 2) may be 30 CPU cores, 60 GB memory, 110 GB/s network BW, or 110 GB/s I/O bandwidth.

Method 500 continues to block 506 where the processing logic receives a list of available computing resources. The list includes a threshold resource amount of at least a computing resource to be consumed at each of one or more consecutively executed phases of the computing jobs in the combination.

Method 500 continues to block 508 where the processing logic compares the total amount of the computing resource with the threshold resource amount to determine if enough of the computing resource exists to execute the computing jobs in the combination.

Method 500 continues to decision block 510 where the processing logic determines whether to reject or admit the combination of jobs. The decision to admit or reject the combination of jobs is based on the comparison in block 508. The following describes an example of determining whether to reject or admit a combination of jobs. If a combination of jobs may be determined to utilize less or the same amount of the available resource (i.e., the threshold resource amount), then the combination of jobs may be admitted. Otherwise, enough resources may not be available to complete the combination of jobs. Therefore, the combination of jobs may be rejected.

If the decision block 510 determines to admit the combination of jobs, method 500 continues to block 512 where the processing logic schedules the combination and provides it to data nodes 170 for execution.

Data nodes 170, for example, may execute the jobs in parallel and perform a MapReduce on each job. Data nodes 170, after receiving the combination of jobs and dedicating the available amount of resources to execution of the jobs, may provide an update of available resources to the resource management server 160. The resource management server 160 may inform the scheduler 124 of the update.

Returning back to method 500, if in decision block 510, the processing logic determines that the combination of jobs should be rejected (for example, if not enough resources are available to execute the combination of jobs), the method continues to block 514. At block 514, the processing logic returns the combination of jobs to the job queue, and the method ends. The identifiers associated with the unscheduled computing jobs may then be re-appended to the job queue, in block 404 of FIG. 4. The unscheduled jobs may then be combined into a second combination of jobs, after being combined with other jobs in the job queue. The method in FIGS. 4 and 5 then repeats. In an implementation, an updated list of available resources may be received by the processing logic at the time of combining the jobs in the second combination of jobs. Also, in a second iteration, a second combination of the total amount of a computing resource required by the second combination of jobs may be compared by the processing logic with the updated list of available resources. The processing logic then determines whether to admit or reject the second combination of jobs.

The following describes an example of combination of jobs (e.g., two or more MapReduce jobs) that is executed. The data nodes 170, after receiving the combination of jobs from the scheduler 124, execute each of the combination of jobs and perform map-reduction on each of the jobs. Map-reduction may be performed separately for each job, however, performing map-reduction on a first job in the combination of jobs may be performed in parallel to performing map-reduction on the second job in the combination. If two jobs are requested by the same client, the two completed jobs may be recombined into a combination of jobs, prior to submission to the client. Otherwise, the two completed jobs may remain separate and be submitted to respective requesting clients. While the combination of jobs may be carried out by the data nodes 170, the data nodes 170 may inform the resource management server 160 of a change in available resources. For example, if the combination of jobs requires fifty units of a resource, then data nodes 170 inform the resource management server 160 that fifty less units of a resource will be available for use. In an implementation, the data nodes 170 may inform the resource management server 160 in the beginning of execution of a job, in the middle of execution of a job, or towards the ends of the execution of a job about the change in the amount of one or more resources.

As described above with FIGS. 3 and 4, in order to select a subset of jobs to combine into a combination of jobs, some criterion may be used in determining which jobs should be batched together. The scheduler 124 may determine all valid combination of computing jobs. Alternatively, the scheduler 124 may extract some information from job profiles in order to find a similarity between jobs and determine at least a subset of valid combination of computing jobs and combine such jobs into a combination of jobs. The scheduler may determine to combine one or more unscheduled jobs based on a certain criterion.

Figure 6:
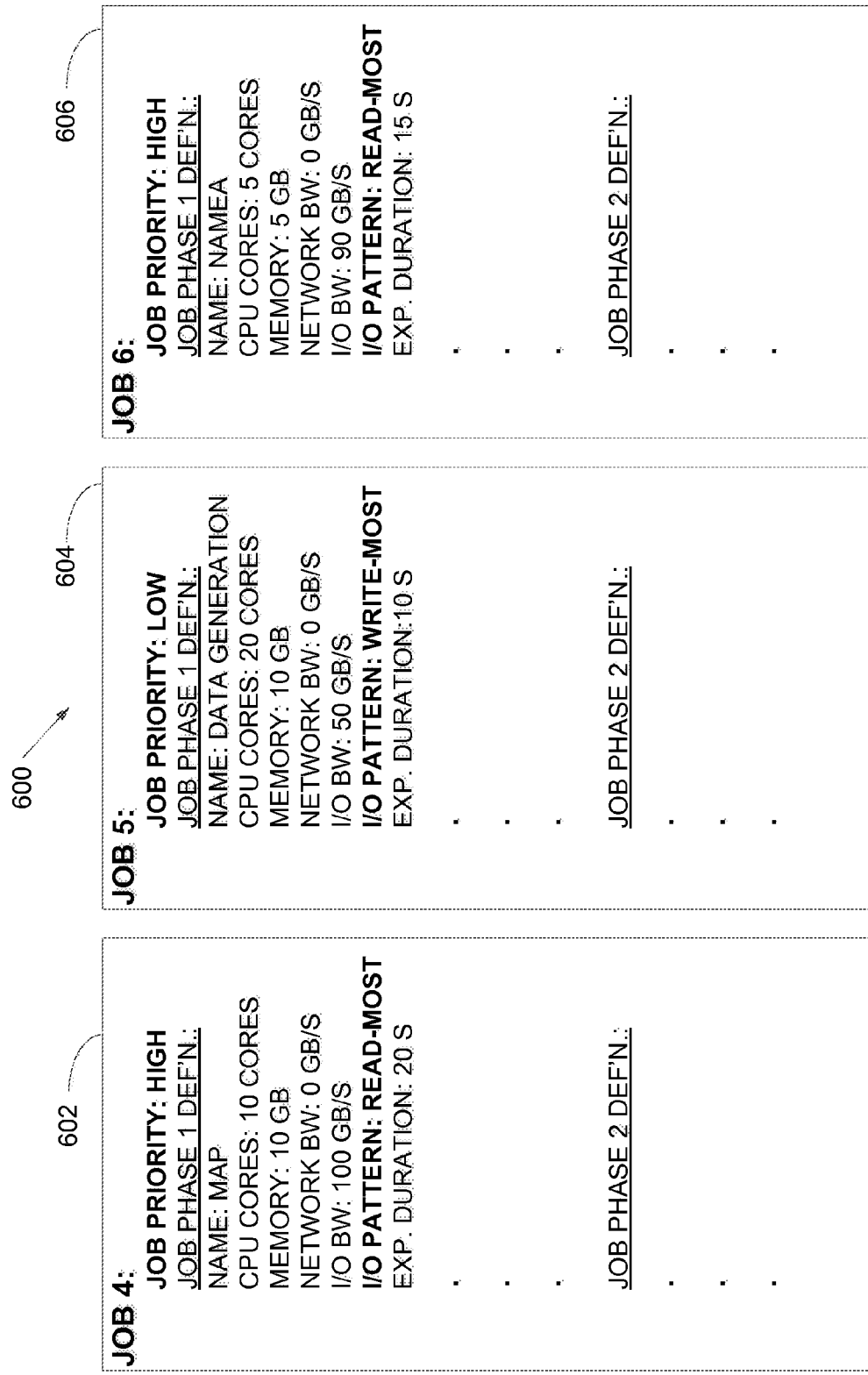
FIG. 6 is a block diagram illustrating another example of job profiles, according to an implementation of the disclosure.

FIG. 6 is a block diagram illustrating another example of job profiles, according to an implementation of the disclosure. The job profiles 600 include a job profile 602 for Job 4, a job profile 604 for Job 5 and a job profile 606 for Job 6. The job profiles 600 are generated by the profiler 123 of admission controller 122 in FIG. 1. Each job, for which a job profile may be generated, may be submitted to the admission controller server 120 by the client device 150, via the network 101. The job profiles 600 may include some all of the same fields as job profiles 200 in FIG. 2. The job profiles 600 may include additional fields such as "job priority" and "I/O pattern."

The profiler 123 divides a job into multiple phases based on a job type of the job. The following provides an example of how a job is determined to be divided into multiple phases. Job 4 may be determined to be a MapReduce job based on a job type received by the profiler when Job 4 is received. The profiler 123 may divide Job 4 into three phases based on the job type. Each phase of Job 4 may be associated with a respective job phase definition. One of job phase one's definition may be a name. The name of job phase one's definition may be map. Job phase one's definition may include multiple fields. Additional fields than depicted may be generated for Job 4's profile. Although phase one may be depicted in all of the job profiles in FIG. 6, additional phases than depicted are included in each of the profiles. As described above with respect to FIG. 2, the profiler 123 determines which resources and an amount of those resources that are required in order to execute a phase of the job. The profiler 123 also determines an expected duration time expected to complete each phase of the job. The expected duration time is input into a job phase definition of a job.

Job 4 includes the additional field "job priority." Job 4 may be assigned a high priority, Job 5 may be assigned a low priority, and Job 6 may be assigned a high priority. In another embodiment (not depicted), multiple phases of the job may be associated with respective priorities. The job priorities may be determined by the profiler 123 and input into the job profiles. In an implementation, the job priorities are based on the type of job to be executed. If a job needs to be executed in a time-sensitive matter, the client (employing client device 150) submitting the job may indicate that the job may be time-sensitive. Based on this information, the profiler 123 inputs the job priority as high in the job's profile. In another implementation, a priority of a job may be determined by the profiler 123 based on the type of the job, without input from the client who submitted the job. The following provides an example of a job that is a high priority job. If the client wishes to execute a MapReduce job to sort data in a database for the government, the MapReduce job type may trigger a high priority. Thus, the profiler 123 may assign a high priority to the job by inputting a priority field in the job's profile.

Another field in the job profiles 600 is an I/O pattern. When analyzing the operations required for a phase of a job, the profiler 123 may determine an I/O pattern for the operations. The profiler 123 may determine whether the operation pattern for a phase of a job may be read-most or write-most on the same data in the job. The pattern may be input by the profiler 123 into the job's profile.

I/O patterns may be analyzed in order to combine jobs into a combination of jobs. When read-most jobs are mixed together with write-most jobs, they may block one another. Write operations are exclusive of read operations. That is, write operations block pending read requests. Similarly, if there are pending read requests, a write request waits until all read requests are completed before the write request may be executed. If read-most jobs and write-most jobs are separated, the read request may not be blocked by the write requests. Batching read-most jobs together can increase read performance. The scheduler 124, by batching alike I/O pattern jobs together, can dynamically optimize I/O access pattern.

In an implementation, jobs may be submitted for log-structured file systems. The log-structured file systems may favor large write batches. If writes requests can be batched for the log-structured file systems, they can be dispatched in fewer and more efficient media-level writes. However, if read and write are mixed and batching of similar I/O pattern jobs may not be performed, the probability that the writes may be batched together based on other criteria may be slim. Thus, a less efficient job combination may be produced.

Therefore, by placing I/O pattern and/or job priority fields in the job profiles, the profiler 123 allows the scheduler 124 to use these fields as additional criterion to combine jobs more efficiently. Thus, inputting the additional I/O pattern and job priority fields into the profile for each phase of jobs allows determination of additional multi-dimensional factors that can be utilized by the scheduler 124 when combining jobs.

In response to extracting I/O pattern and/or job priority fields from the job profiles 600, the scheduler 124 may determine to combine Job 4 with Job 6 because they have similarities with respect to job priorities and I/O pattern. Job 5 may not be combined with Job 4 and Job 6, but may instead be combined with another job with similar fields in its job profile.

Figure 7:
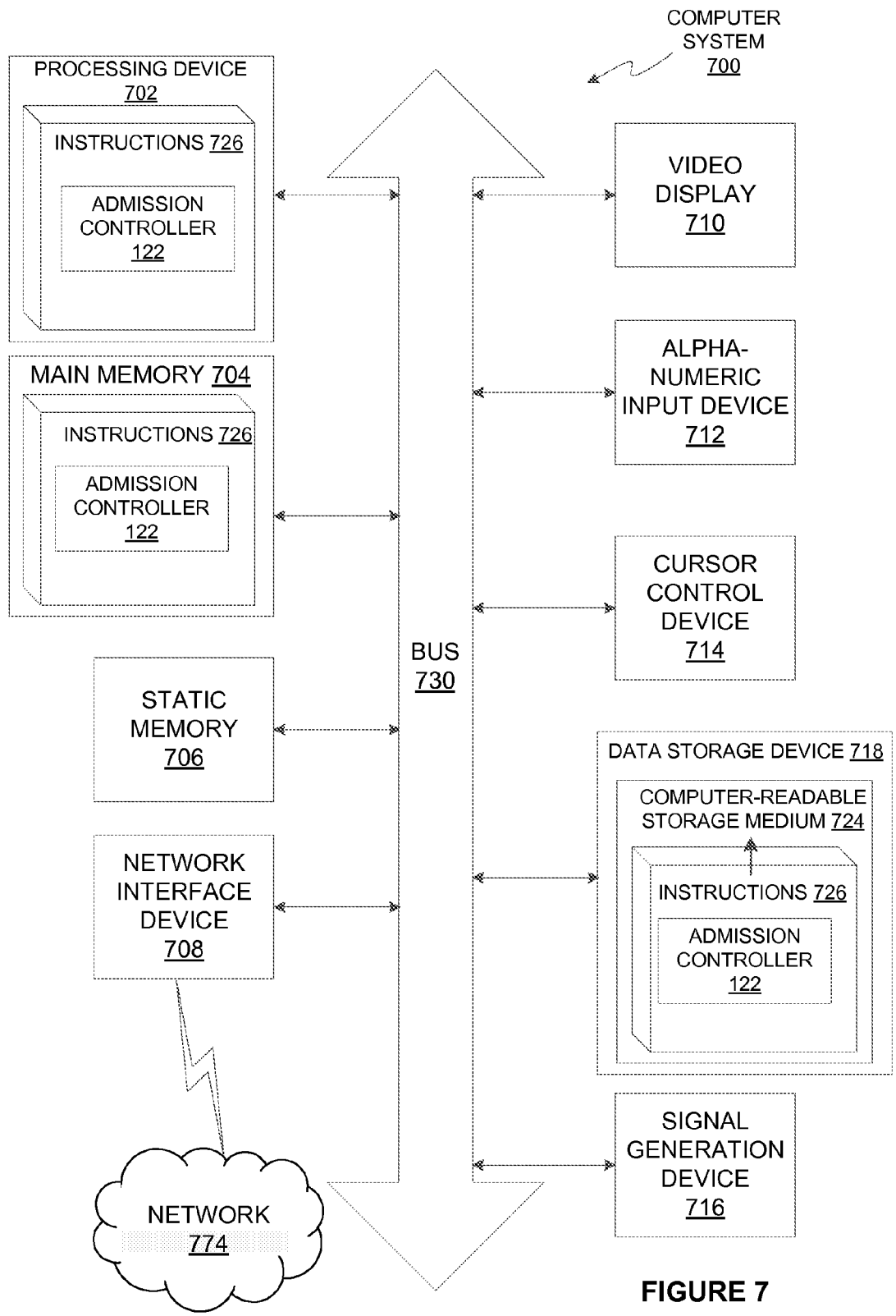
FIG. 7 illustrates a block diagram of an example computer system that may implement systems and methods described herein.

FIG. 7 illustrates a block diagram of an example computer system that may implement systems and methods described herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708 communicably coupled to a network 774. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 724 on which is stored software 726 embodying any one or more of the methodologies of functions described herein. The software 726 may also reside, completely or at least partially, within the main memory 704 as instructions 726 and/or within the processing device 702 as processing logic 726 during execution thereof by the computer system 700; the main memory 704 and the processing device 702 also constituting machine-accessible storage media.

The machine-readable storage medium 724 may also be used to store instructions 726 to implement admission controller 122 to implement any one or more of the methodologies of functions described herein in a computer system, such as the system described with respect to FIGS. 1 and 2, and/or a software library containing methods that call the above applications.

While the machine-accessible storage medium 724 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "identifying", "converting", "causing", "determining", "selecting", "requesting", "querying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. The machine readable storage medium may also be referred to as a computer readable storage medium.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims, which in themselves recite only those features regarded as the disclosure.

What is claimed is:

1. A method comprising:
receiving, by a processing device, a profile of a first computing job comprising a first job phase and a second job phase, the profile comprising a plurality of job phase definitions, each job phase definition defining an estimated amount of a computing resource utilized by executing each respective job phase of the first computing job;
appending, by the processing device, an identifier of the first computing job to a job queue;
selecting, by the processing device from the job queue, a combination of a second computing job to execute with the first computing job in view of the profile, wherein the selecting comprises determining that an estimated time to complete the first job phase and the second job phase of the first computing job corresponds to an estimated time to complete respective first and second job phases of the second computing job; and responsive to determining that a total of the estimated amount of computing resources utilized by executing the first and second computing jobs satisfies a threshold resource amount associated with each respective job phase of the combination, scheduling, by the processing device, the combination for execution.

2. The method of claim 1, wherein the threshold resource amount is a function of an amount of the computing resource that is available for scheduling.

3. The method of claim 1, further comprising executing, by the processing device, the selected combination of the computing jobs.

4. The method of claim 1, wherein selecting the combination of computing jobs further comprises:
generating, in view of the profile, a plurality of computing job combinations; and
selecting, from the plurality of computing job combinations, a combination that optimizes a certain resource scheduling criterion.

5. The method of claim 4, wherein the plurality of computing job combinations comprises at least a subset of valid combinations of computing jobs.

6. The method of claim 4, wherein the resource scheduling criterion is provided by a function of an amount of the computing resource unassigned to at least one of the computing jobs of the selected combination.

7. The method of claim 1, wherein the computing resource is provided by at least one of: central processing unit cores, memory, network bandwidth, or input/output bandwidth.

8. The method of claim 1, wherein the combination of the computing jobs comprises at least a first computing job comprising a first phase having a first estimated duration, wherein the combination of the computing jobs comprises at least a second computing job comprising a second phase having a second estimated duration, and wherein a difference of the first estimated duration and the second estimated duration falls below a certain threshold.

9. A system comprising:
a memory; and
a processing device, operatively coupled to the memory, to:
receive a profile of a first computing job comprising a first job phase and a second job phase, the profile comprising a plurality of job phase definitions, each job phase definition defining an estimated amount of a computing resource utilized by executing each respective job phase of the first computing job;
append an identifier of the first computing job to a job queue;
select, from the job queue, a combination of a second computing job to execute with the first computing job in view of the profile, wherein to select comprises determining that an estimated time to complete the first job phase and the second job phase of the first computing job corresponds to an estimated time to complete respective first and second job phases of the second computing job; and
responsive to determining that a total of the estimated amount of computing resources utilized by executing the first and second computing jobs satisfies a threshold resource amount associated with each respective job phase of the combination, schedule the combination for execution.

10. The system of claim 9, wherein the threshold resource amount is a function of an amount of the computing resource that is available for scheduling.

11. The system of claim 9, wherein the processing device is further to execute the selected combination of the computing jobs.

12. The system of claim 9, wherein to select the combination of computing jobs, the processing device is further to:
generate, in view of the profile, a plurality of computing job combinations; and
select, from the plurality of computing job combinations, a combination that optimizes a certain resource scheduling criterion.

13. The system of claim 12, wherein the plurality of computing job combinations comprises at least a subset of valid combinations of computing jobs.

14. The system of claim 12, wherein the resource scheduling criterion is provided by a function of an amount of the computing resource unassigned to at least one of the computing jobs of the selected combination.

15. A non-transitory computer readable storage medium comprising instructions that, when executed by a processing device, cause the processing device to:
receive, by the processing device, a profile of a first computing job comprising a first job phase and a second job phase, the profile comprising a plurality of job phase definitions, each job phase definition defining an estimated amount of a computing resource utilized by executing each respective job phase of the first computing job;
append an identifier of the first computing job to a job queue;
select, from the job queue, a combination of a second computing job to execute with the first computing job in view of the profile, wherein to select comprises determining that an estimated time to complete the first job phase and the second job phase of the first computing job corresponds to an estimated time to complete respective first and second job phases of the second computing job; and
responsive to determining that a total of the estimated amount of computing resources utilized by executing the first and second computing jobs satisfies a threshold resource amount associated with each respective job phase of the combination, schedule the combination for execution.

16. The non-transitory computer readable storage medium of claim 15, wherein the threshold resource amount is a function of an amount of the computing resource that is available for scheduling.

17. The non-transitory computer readable storage medium of claim 15, including further instructions that, when executed by the processing device, cause the processing device to execute the selected combination of the computing jobs.

18. The non-transitory computer readable storage medium of claim 15, wherein the processing device is further to:
generate, in view of the profile, a plurality of computing job combinations; and
select, from the plurality of computing job combinations, a combination that optimizes a certain resource scheduling criterion.

19. The non-transitory computer readable storage medium of claim 18, wherein the plurality of computing job combinations comprises at least a subset of valid combinations of computing jobs.

20. The non-transitory computer readable storage medium of claim 15, wherein the computing resource is provided by at least one of: central processing unit cores, memory, network bandwidth, or input/output bandwidth.

* * * * *